United States Patent [19]

Kadosaki et al.

[11] Patent Number: 4,972,597
[45] Date of Patent: Nov. 27, 1990

[54] THREE-DIMENSIONAL DISPLACEMENT GAGE

[75] Inventors: Masahiro Kadosaki; Kihachiro Tohbo; Hiroshi Sugimori; Katsuji Taniguchi; Shigeru Yamada, all of Takaoka, Japan

[73] Assignees: Governor of Toyama Prefecture, Yutaka Nakaoki, Toyama; Kitamura Machinery Co., Ltd., Takaoka, both of Japan

[21] Appl. No.: 448,197

[22] Filed: Dec. 14, 1989

[30] Foreign Application Priority Data

Dec. 15, 1988 [JP] Japan ................ 63-314853

[51] Int. Cl.$^5$ .................. G01B 11/24; G01B 7/02
[52] U.S. Cl. ...................... 33/558; 33/556; 33/561
[58] Field of Search .......... 33/558, 561, 556, 559, 33/503, 1 M, 832

[56] References Cited

U.S. PATENT DOCUMENTS

| 1,854,838 | 4/1932 | Hartsough | 33/556 |
|---|---|---|---|
| 3,520,063 | 7/1970 | Rethwish et al. | 33/558 |
| 3,766,653 | 10/1973 | McKay, Sr. | 33/561 |
| 3,945,124 | 3/1976 | Jacoby et al. | 33/561 |
| 4,130,941 | 12/1978 | Amsbury | 33/558 |
| 4,495,703 | 1/1985 | Sakata et al. | 33/503 |
| 4,513,507 | 4/1985 | Laskowski | 33/558 |
| 4,530,159 | 7/1985 | Ernst | 33/503 |
| 4,536,661 | 8/1985 | McMurtry | 33/832 |
| 4,581,826 | 4/1986 | Ernst | 33/558 |
| 4,882,848 | 11/1989 | Breyer et al. | 33/832 |

Primary Examiner—William A. Cuchlinski, Jr.
Assistant Examiner—Christopher W. Fulton
Attorney, Agent, or Firm—Foley & Lardner, Schwartz, Jeffery, Schwaab, Mack, Blumenthal & Evans

[57] ABSTRACT

A three-dimensional displacement gauge comprising a housing, a probe rotatably and slidably mounted on the housing, the probe is slidable along a first direction and having a contact member attached at one end thereof, two emitting members mounted on the probe each for emitting a light beam, two-dimensional measuring member such as a position sensor fixed to the housing for detecting the light beams, a biasing spring for biasing the probe toward the contact member, and a limit switch attached to the housing for detecting whether or not the probe moves in the first direction. The two-dimensional measuring member detects the light beams struck thereon so as to measure a small displacement of the contact member of the probe either in the first direction or in a second direction perpendicular to the first direction. In another mode, the two emitting members are mounted on the housing, and a mirror is mounted at the other end of the probe, and the two-dimensional measuring element detect the light beams struck thereon from the emitting members by way of the mirror.

9 Claims, 5 Drawing Sheets ically detect three-dimensional displacement of its probe. This three-dimensional measuring device has detecting means such as differential transformers. But this type of device is too expensive and has a large, heavy and complicated structure. The probe has too little rigidity to apply to machine tools, but is suitable for accurate measuring systems if it is carefully handled.

Other problems are chattering and electrical noise caused by electrical contacts and devices such as a differential transformer provided in the probe. To avoid this problem, an optical type probe is provided having resistance to electrical noise.

A conventional optical probe includes a contact member attached to a holder and a light receiving member attached to a spindle head of a machine tool. Any displacement of the contact member is detected by the light receiving member.

In this optical probe, the optical axis must be adjusted prior to operation. Fouling of the optical system causes some trouble. The conventional optical probe cannot detect quantitatively three-dimensional displacement, but can detect only one-dimensional displacement.

Some conventional touch probes are supported in a housing in such a manner that the probe body is set on three convex portions formed on the housing so that the sensitivity varies according to the approaching direction of the probe body toward a workpiece. This results in inaccuracy.

Generally, a touch probe to be adapted to a machine tool need not detect quantitatively three-dimensional displacement, but is sufficient to detect either small displacement in a first direction or small displacement in a second direction perpendicular to the first direction.

Large complicated touch probes have been devised heretofore, which can detect three-dimensional displacement and a suitable to precise measuring systems. But, a touch probe for measurement either small displacement in a first direction or in a second direction perpendicular to the first direction is not yet provided.

THREE-DIMENSIONAL DISPLACEMENT GAGE

BACKGROUND OF THE INVENTION

This invention relates to a three-dimensional displacement gauge to be used in a machine tool or a three-dimensional measuring system.

A conventional touch probe to be used in a machine tool can detect whether or not a contact member of the touch probe touches a workpiece carried on a table of the machine tool. This conventional touch probe is of a binary (ON/OFF) nature. When the contact member of the touch probe touches the workpiece, the contact member itself moves a little. This results in a small error. But the conventional touch probe cannot detect this little movement quantitatively so that it cannot correct the small error.

On the other hand, a three-dimensional measuring device for precise use can quantitatively detect three-dimensional displacement of its probe. This three-dimensional measuring device has detecting means such as differential transformers. But this type of device is too expensive and has a large, heavy and complicated structure. The probe has too little rigidity to apply to machine tools, but is suitable for accurate measuring systems if it is carefully handled.

SUMMARY OF THE INVENTION

It is an object of the invention to provide a three-dimensional displacement gauge for the measurement of either small displacement in a first direction or small displacement in a second direction perpendicular to the first direction.

In accordance with the present invention, a three-dimensional displacement gauge comprises a housing, a probe rotatably and slidably mounted on the housing, the probe being slidable along a first direction and having a contact member attached at one end thereof, two emitting means mounted on the probe each for emitting a light beam, two-dimensional measuring means such as a position sensor fixed to the housing for detecting the light beams struck thereon, a biasing spring for biasing the probe toward the contact member, and a limit switch attached to the housing for detecting whether or not the probe moves in the first direction. The two-dimensional measuring means detects the light beams struck thereon so as to measure small displacement of the contact member at the end of the probe either in the first direction or in a second direction perpendicular to the first direction.

In accordance with another mode of the present invention, a three-dimensional displacement gauge comprises a housing, probe rotatably and slidably mounted on the housing, the probe is slidable along a first direction, the probe having a contact member attached at one end thereof, and a mirror mounted on the other end thereof, two emitting means mounted on the housing each for emitting a light beam, two-dimensional measuring means such as a position sensor fixed on the housing for detecting the light beams struck thereon from the emitting members by way of the mirror, a biasing spring for biasing the probe toward the contact member, and a limit switch fixedly attached to the housing for detecting whether or not the probe moves in the first direction. The two-dimensional measuring means detects the light beams struck thereon so as to measure small displacement of the contact member of the probe either in the first direction or in a second direction perpendicular to the first direction.

DESCRIPTION OF THE PREFERRED EMBODIMENT

Figure 1:
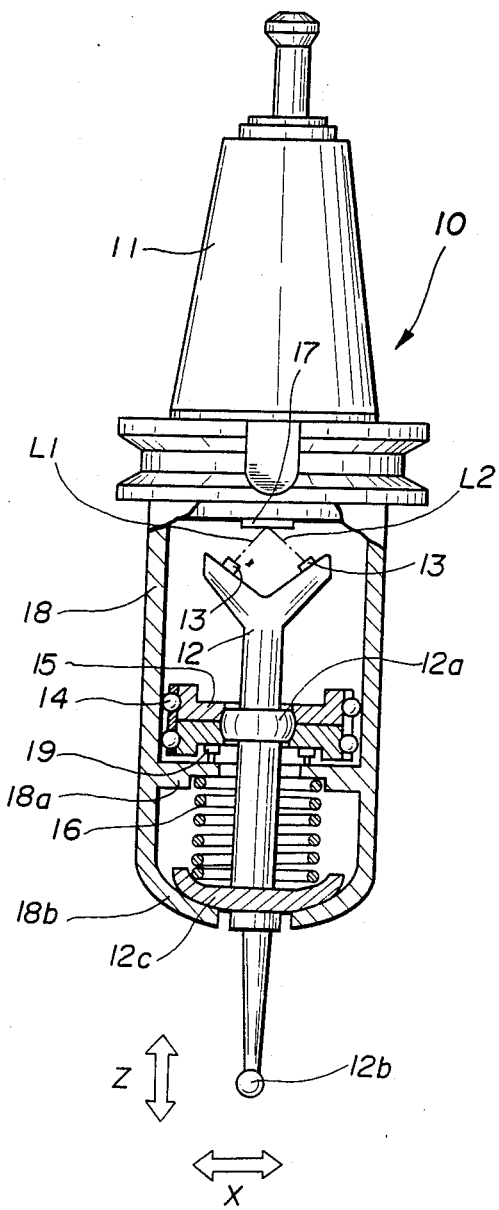
FIG. 1 is a side view, partially sectioned, showing an embodiment of a three-dimensional displacement gauge according to this invention.

FIG. 1 shows a three-dimensional displacement gauge 10 (it is abbreviated to a gauge) according to this invention. The gauge 10 includes a tapered shank 11 to be inserted into an opening formed in a measuring section of a machining center (not shown).

A cylindrical housing 18 is formed under the tapered shank 11. A structure for measurement is provided inside the housing 18.

An elongated probe 12 is slidably and rotatably supported by a support member 15. In the housing 18. The probe 12 extends along an axis of the housing 18, which is parallel to a direction Z.

The support member 15 has an opening formed at a center portion thereof for supporting the probe 12. An inner surface of the opening is spherical. The probe 12 has a support portion 12a the outer surface of which is spherical corresponding to the inner surface of the opening in the support member 12. The probe 12 can rotate about a center of the spherical support portion 12a relative to the support member 15. A lubricating oil (or a lubricant) may be provided between support member 15 and support portion 12a of the probe 12, if necessary.

A plurality of balls 14 are rotatably mounted at a periphery of the support member 15. The balls 14 contact with the inner wall of the housing 18. The support member 15 can slide relative to the housing 18 along the axis of the housing 18, or in the direction Z.

A spherical contact member 12b is attached at a lower end of the probe 12. The contact member 12b is made of, for example, ruby.

The probe 12 has a flange member 12c attached between the support portion 12a and the contact member 12b. When the probe 12 stands in the initial position as shown in FIG. 1, or when it does not move in the direction Z, a lower surface of the flange member 12c contacts with an upper wall of the lower portion 18b of the housing 18. The under surface of the flange member 12c is spherical. Its center of curvature coincides with the center of the support portion 12a or the rotation center of the probe 12. The upper surface of the lower portion 18b of the housing 18 is also spherical corresponding to the under surface of the flange member 12c. Thus, the probe 12 can smoothly rotate about the center of the support portion 12a while the flange member 12c is contacting with the inner surface of the housing 18.

The housing 18 has a flange portion 18a formed at an intermediate portion thereof. The flange portion 18a has a central opening through which the probe 12 is placed.

A biasing spring 16 is provided between the flange portion 18a and the flange member 12c. The biasing spring 16 always biases the probe 12 downwardly so that the probe 12 tends to stand in its initial position shown in FIG. 1.

In operation, when the contact member 12b touches a workpiece, the contact member 12b moves in a random direction. In some cases the probe 12 moves in such a manner that the probe 12 rotates about the center of its support portion 12a while the lower surface of the flange portion 12c of the probe 12 still contacts with the inner wall of the housing 18. In other cases the flange portion 12c moves upwardly in the direction Z apart from the inner wall of the housing 18. After measurement, the probe 12 returns in the initial position by means of the spring 16.

An upper portion of the probe 12 is divided into two branches, each end having an emitting member 13 attached thereto.

A position sensor or a two-dimensional measuring element, for example a position sensing device or PSD 17 for two-dimensional position transducing, is fixed inside the housing opposite to the emitting members 13. A PSD is one of the semiconductor elements for position transducing. The position sensing device PSD 17 is provided to the housing 18 with fixed relationship while the emitting members 13 are fixed to the probe 12. The PSD 17 can detect a lighting position (spot) where a light beam L1 or L2 from the emitting members 13, 13 is struck. The emitting members 13, 13 are alternately turned on in time-sharing manner. The single PSD 17 can detect two light striking spots from two emitting members, respectively.

A limit switch 19 is mounted at an upper surface of the flange portion 18a of the housing 18. The limit switch 19 detects whether the support member 15 and consequently the probe 12 moves in the direction Z or not.

Figure 3A:
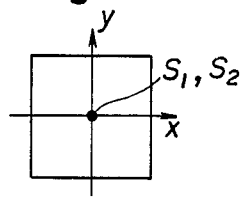
FIGS. 3a–3d are diagrammatic views showing operation of the gauge.
Figure 3A:
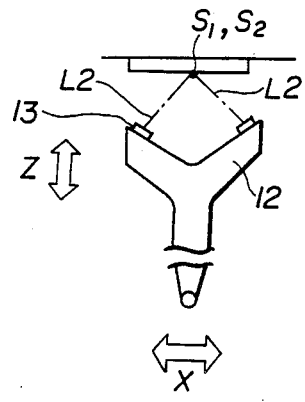

Operation of the gauge 10 is explained with reference to FIGS. 3a–3d. FIG. 3a shows the probe 12 standing in the initial position, wherein displacement of the probe 12 is zero. The light beams L1, L2 from two light sources 13, 13 strike at one spot (o, o) on the PSD 17.

Figure 3B:
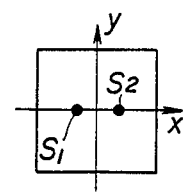
Figure 3B:
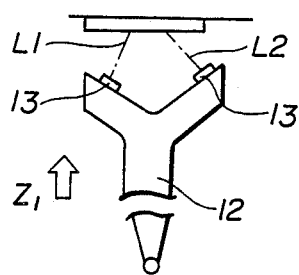

In FIG. 3b, the probe contact member 12b moves in the direction Z by a small displacement Z1. The light beams on the PSD 17, or the spots S1, S2, move in the opposite direction from each other by a same distance. The distance in x-y coordinate are converted into the displacement Z1 of the probe contact member 12b.

Figure 3C:
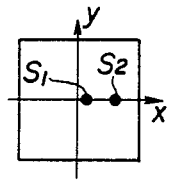
Figure 3C:
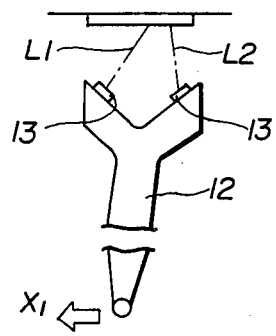

In FIG. 3c, the probe contact member 12a moves in the direction X by a small displacement X1 from its initial position. The light beams struck on the PSD 17, or the spots S1, S2 move in a same direction on the PSD 17. The moving distances in x-y coordinate of the spots S1, S2 on the PSD 17 are converted into the displacement X1 of the probe contact member 12b.

Figure 3D:
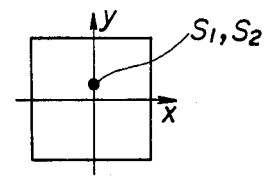
Figure 3D:
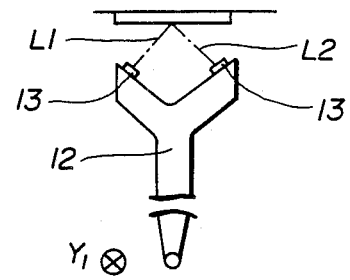

In FIG. 3d, the contact member 12a moves in the direction Y from the initial position by a small displacement Y1. Two spots S1, S2 move in a same direction by a same distance on the PSD 17. The distance in x-y coordinate on the PSD 17 is converted into the displacement Y1 of the probe contact member 12b.

In operation, the probe contact member 12a moves in a random direction.

Figure 4:
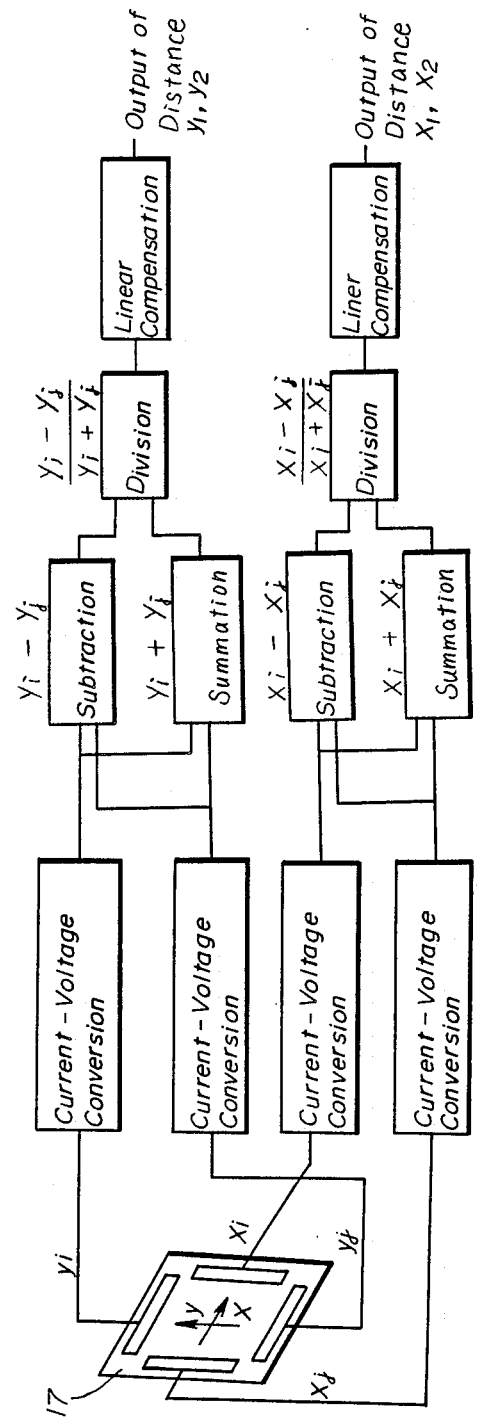
FIG. 4 is a block diagram showing a signal processing manner for finding displacement of a light beam struck on a two-dimensional measuring element.

The moving distance of the spots S1, S2 in x-y coordinate on the PSD 17 are calculated, respectively, in a manner shown in FIG. 4. This method shown in FIG. 4 is the same as a conventional calculating method employed in one-dimensional displacement gauge. Two light beams L1, L2 or two spots S1, S2 alternately appear on the PSD 17 in a time sharing manner, so the moving distance D1 (x1, y1) of the spot S1 on the PSD 17 and the moving distance D2 (x2, y2) of the spot S2 on the PSD 17 are alternately obtained in corresponding time sharing manner.

Figure 5:
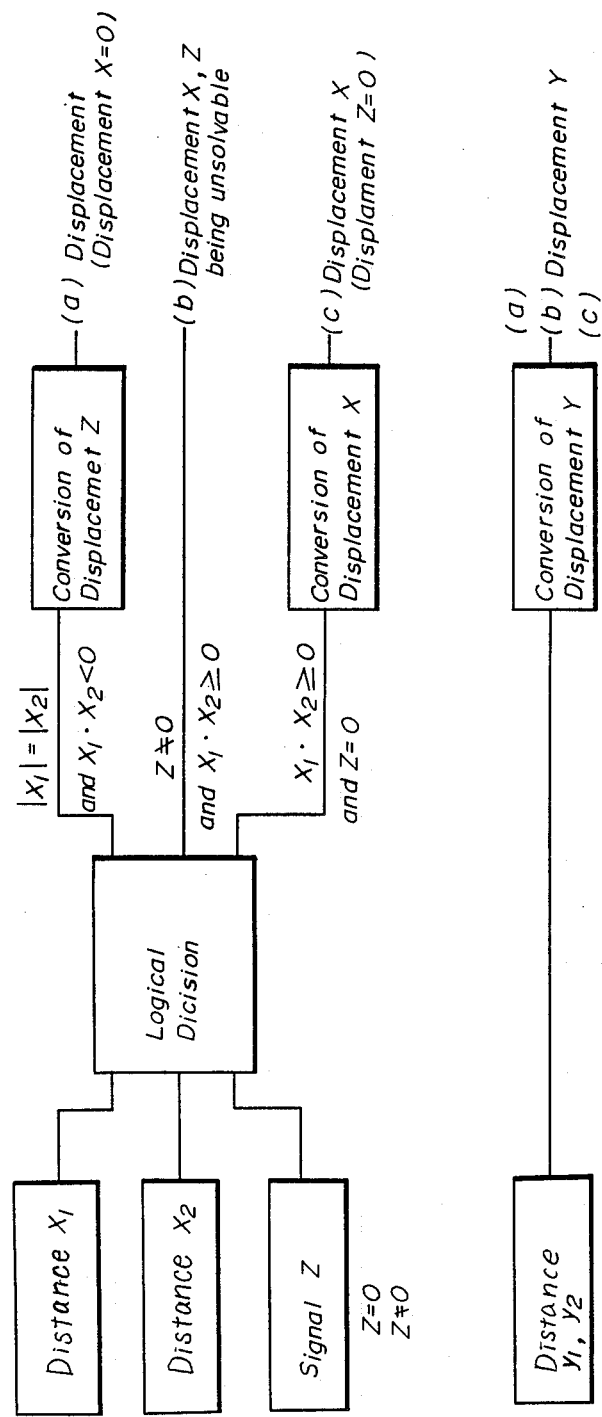
FIG. 5 is a block diagram showing a signal processing manner for finding displacement of a probe contact member.

As shown in FIG. 5, the displacement of the probe contact member 12a is calculated from the value of D1 (x1, y1) and D2 (x2, y2). The Z-signal from the switch 19 shows whether displacement Z is zero or not.

Figure 2:
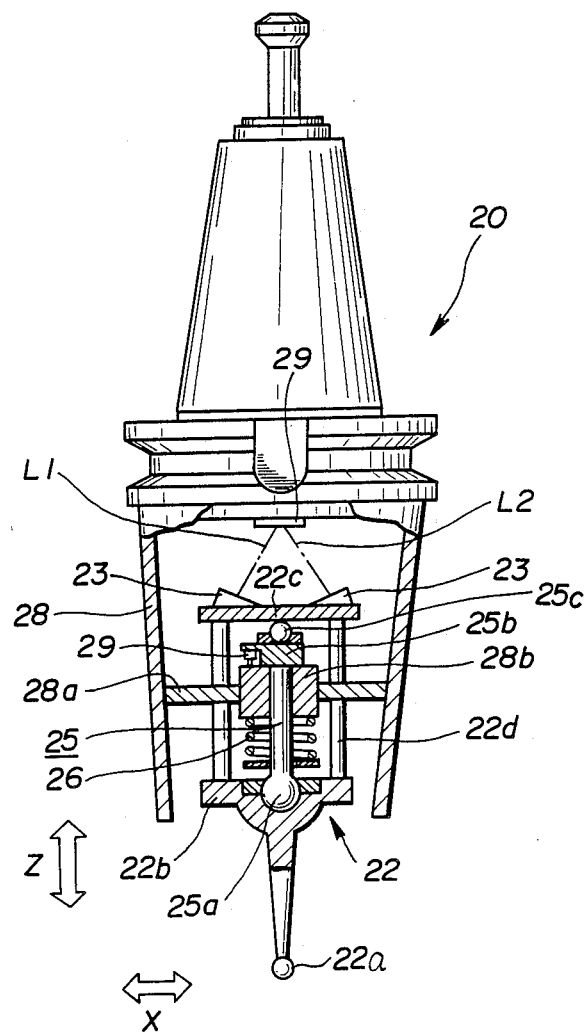
FIG. 2 is a side view, partially sectioned, showing another embodiment.

When the X-Y-Z coordinates are decided as in the embodiment shown in FIG. 2, the value of displacement Y can be always calculated. The value of displacement Y can be obtained by the value of y1 (or y2).

On the other hand, the values of displacement X and displacement Z, can not always be calculated. Displacement X and displacement Z are calculated in the following three cases (a)–(c). The cases (a)–(c) are classified according to a movement of the probe 12.

(a) $|x1| = |x2|$ and $x1 \cdot x2 < 0$

The contact member 12b moves in the direction Z, not in the direction X. In this case, the value of x1 or x2 is converted into the value of displacement Z of the contact member 12b. And, the value of displacement X is zero.

(b) $x1 \cdot x2 \geq 0$ and $Z \neq 0$

The contact member 12a moves in the direction X and Z. In this case, the value of the displacement X and Z of the contact member 12a cannot be measured.

(c) $x1 \cdot x2 \geqq 0$ and $Z=0$

The contact member 12a moves in the direction X, not in the direction Z. The values of x1 and x2 are converted into the value of displacement X of the contact member 12a.

In the cases (a) and (c), either small displacement in the direction Z or small displacement in the direction X can be measured. In the cases (a) and (c) the displacement Y can also be measured, after all, either small displacement of the contact member 12a in the direction Y and Z or small displacement in the direction X and Y can be measured. In the case (b), small displacement only in direction Y can be measured.

FIG. 2 shows another embodiment according to this invention. A gauge 20 has a probe 22, which is supported in different manner from the embodiment shown in FIG. 1. This will be explained in greater detail below.

The probe 22 includes a slide member 25, a plate member 22c, a middle member 22b having a contact member 22a, and connecting member 22d for connecting the plate member 22c and the middle member 22b.

The slide member 25 is slidably supported in the housing 28. A ball 25a is formed at a lower portion of the slide member 25. The ball 25a is supported in a spherical concave portion formed on an upper portion of the middle member 22b. The ball 25a cooperates with the spherical concave portion in a manner like an universal joint so that the middle member 22 can rotate relative to the slide member 25. Another member. The ball 25c contacts with a lower surface of the plate member 22c in FIG. 2.

The slide member 25 is slidably supported by a guide member 28b in a direction Z. The guide member 28b is supported by ribs 28a which are connected to the housing 28. The ribs 28a are located apart from the connecting members 22a so as not to contact each other when the probe 22 moves.

The probe 22 is supported in the above mentioned manner so that the probe 22 can move in direction and can rotate about a center of the ball 25a.

In FIG. 2, the probe 22 stands in the initial position. The probe 22 is to be returned in the initial position by a biasing spring 26 and gravity.

Figure 6:
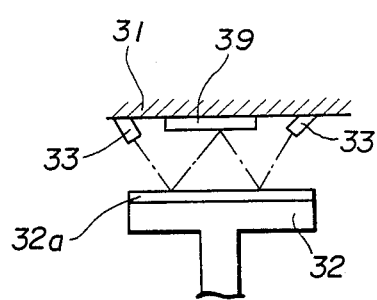
FIG. 6 is a fragmentary view showing another embodiment of the invention.

Referring to FIG. 6, another embodiment is briefly explained.

FIG. 6 is a view showing only parts of a gauge. A reflecting mirror 32a is fixed to an upper portion of a probe 32. Two emitting members 33 are fixed to a housing 31. A two-dimensional measuring element, or a position sensor 39 is attached to the housing. The mirror 32a faces the emitting members 33 and the two-dimensional measuring element 39. The probe 32 is supported in a manner similar to the above mentioned embodiments.

Two light beams emitted from the emitting elements 33, 33 are reflected by the reflecting mirror 32a and strike on the measuring element 39. When the probe 32 moves, consequently the mirror 32a moves, two light beams struck on the measuring element 39 also move according to the movement of the probe 32. Displacement of a contact member attached at the end of the probe 32 can be measured in a similar manner to the above described embodiment.

The invention is not restricted to only the above mentioned embodiments. For example, a pair of two-dimensional measuring elements may be provided each for receiving only one light from a corresponding emitting element. The Z-signal may be determined by a control unit of a machine tool according to a work movement.

What is claimed is:

1. A three-dimensional displacement gauge comprising:
    a housing;
    probe rotatably and slidably mounted on the housing, the probe being slidable along a first direction and having a contact member attached at one end thereof;
    two emitting means mounted on the probe each for emitting a light beam;
    a two-dimensional measuring means fixed to the housing for detecting the light beams struck thereon;
    a biasing spring for biasing the probe toward the contact member;
    a limit switch attached to the housing for detecting whether or not the probe moves in the first direction;
    wherein the two-dimensional measuring means detects the light beams struck thereon so as to measure small displacement of the contact member of the probe either in the first direction or in a second direction perpendicular to the first direction.

2. A three-dimensional displacement gauge according to claim 1 wherein the first direction is parallel to a longitudinal direction of the probe.

3. A three-dimensional displacement gauge according to claim 2 wherein the probe is supported by a support member, the support member having a plurality of balls rotatably mounted on a periphery thereof and the balls contacting with an inner wall of the housing.

4. A three-dimensional displacement gauge according to claim 3 wherein the probe has a spherical support portion and the support member has a spherical opening formed at a center thereof for supporting the spherical support portion in such a manner that the probe can rotate about a center of the spherical support portion.

5. A three-dimensional displacement gauge according to claim 4 wherein the probe has a flange member attached thereon between the support portion and the contact member, the flange member having a spherical lower surface a center of curvature of which coincides with the center of curvature of the support portion, and wherein when the probe is in an initial position the lower surface of the flange member contacts with an inner end wall of the housing corresponding in shape to the lower surface of the flange member.

6. A three-dimensional displacement gauge according to claim 1 wherein the probe comprises an elongated slide member having a ball at one end thereof and a middle member having a spherical concave portion for supporting the ball at the end of the slide member in such a manner that the probe can rotate about the ball at the end of the slide member, and wherein the slide member is slidably supported by an annular support member fixed to the housing.

7. A three-dimensional displacement gauge comprising:
    a housing;
    a probe rotatably and slidably mounted on the housing, the probe being slidable along a first direction, the probe having a contact member attached at one end thereof and a mirror mounted on the other end thereof;

two emitting means mounted inside the housing each for emitting a light beam;

a two-dimensional measuring means fixed inside the housing for detecting the light beams struck thereon from the emitting members by way of the mirror;

a biasing spring for biasing the probe toward the contact member; and a limit switch attached to the housing for detecting whether or not the probe moves in the first direction, wherein the two-dimensional measuring means detects the light beams struck thereon so as to measure a small displacement of the contact member of the probe either in the first direction or in a second direction perpendicular to the first direction.

8. A three-dimensional displacement gauge according to claim 1, wherein the biasing spring biases the probe toward a predetermined initial position.

9. A three-dimensional displacement gauge according to claim 7, wherein the biasing spring biases the probe toward a predetermined initial position.

* * * * *